(12) United States Patent
Lecue

(10) Patent No.: US 11,442,963 B1
(45) Date of Patent: Sep. 13, 2022

(54) METHOD OF AND SYSTEM FOR RANKING SUBGRAPHS AS POTENTIAL EXPLANATIONS FOR GRAPH CLASSIFICATION

(71) Applicant: THALES SA, Courbevoie (FR)

(72) Inventor: Freddy Lecue, Montreal (CA)

(73) Assignee: THALES SA, Courbevoie (FR)

( * ) Notice: Subject to any disclaimer, the term of this patent is extended or adjusted under 35 U.S.C. 154(b) by 71 days.

(21) Appl. No.: 17/135,051

(22) Filed: Dec. 28, 2020

Related U.S. Application Data

(60) Provisional application No. 62/955,131, filed on Dec. 30, 2019.

(51) Int. Cl.
*G06F 16/28* (2019.01)
*G06N 20/00* (2019.01)
*G06F 16/22* (2019.01)

(52) U.S. Cl.
CPC ........ *G06F 16/285* (2019.01); *G06F 16/2264* (2019.01); *G06N 20/00* (2019.01)

(58) Field of Classification Search
None
See application file for complete search history.

(56) References Cited

U.S. PATENT DOCUMENTS

| | | | |
|---|---|---|---|
| 6,556,983 B1* | 4/2003 | Altschuler | G06K 9/6296 |
| | | | 707/E17.011 |
| 10,824,674 B2* | 11/2020 | Bekas | G06F 16/9024 |
| 2018/0247224 A1* | 8/2018 | Garcia Duran | G16H 50/20 |
| 2019/0095806 A1* | 3/2019 | Martinez Canedo | G06Q 10/04 |

* cited by examiner

*Primary Examiner* — Amresh Singh
(74) *Attorney, Agent, or Firm* — Hauptman Ham, LLP

(57) ABSTRACT

There is provided a method and a system for ranking subgraphs as potential explanations for a labelled edge type class. A first graph representing labelled digital items is obtained, where each labelled digital item is represented as an entity node connected via a labelled edge type to a property value node. The first graph is combined with a second graph representing structured relations in the labelled digital items to obtain a combined graph. Unlabelled digital items are received and matched to respective subgraphs in the combined graph. A machine learning model is used to embed the combined graph to generate graph vectors, and an expressivity score between matched subgraphs and respective labelled edge types based on the generated graph vectors. The matched subgraphs are ranked based on the expressivity score to obtain a ranked set of subgraphs as potential explanations for a respective labelled edge type class.

20 Claims, 5 Drawing Sheets

METHOD OF AND SYSTEM FOR RANKING SUBGRAPHS AS POTENTIAL EXPLANATIONS FOR GRAPH CLASSIFICATION

CROSS-REFERENCE TO RELATED APPLICATIONS

The present application claims priority on U.S. Provisional Patent Application No. 62/955,131 filed on Dec. 23, 2019.

FIELD

The present technology relates to machine learning (ML) and graph theory in general and more specifically to methods and systems for ranking subgraphs as potential explanations for a classification in a graph.

BACKGROUND

Improvements in computer hardware and technology coupled with the multiplication of connected mobile electronic devices have spiked interest in developing solutions for task automatization, outcome prediction, information classification and learning from experience, resulting in the field of machine learning. Machine learning, closely related to data mining, computational statistics and optimization, explores the study and construction of algorithms that can learn from and make predictions on data.

The field of machine learning has evolved extensively in the last decade, giving rise to self-driving cars, speech recognition, image recognition, personalization, and understanding of the human genome. In addition, machine learning enhances different information retrieval activities, such as document searching, collaborative filtering, sentiment analysis, and so forth.

Machine learning (ML) may generally be divided into broad categories such as supervised learning, unsupervised learning and reinforcement learning. Supervised learning consists of presenting a machine learning model with training data consisting of inputs and outputs labelled by assessors, where the goal is to train the machine learning model such that it learns a general rule for mapping inputs to outputs. Unsupervised learning consists of presenting the machine learning model with unlabeled data, where the goal is for the machine learning model to find a structure or hidden patterns in the data. Reinforcement learning consists of having an algorithm evolving in a dynamic environment without providing the algorithm with labeled data or corrections.

Graphs representations such as knowledge graphs (KGs) have been proven to be useful for real-world application, such as semantic parsing, entity disambiguation, information extraction and question answering. A KG is a multi-relational graph composed of entities represented by nodes and relations, which are represented by different type of edges. A given edge is represented as a triple indicating a type of relation connecting two entities. While KGs are effective in representing structured data, the symbolic nature of how KGs are represented makes them hard to manipulate.

Machine learning and deep learning have achieved exceptional results in the field of pattern recognition in graphs and knowledge graphs, as an example for classification tasks. However, some of the underlying model remain as black boxes i.e., the interpretation and explanation of decisions or predictions of the models remains a highly challenging task.

Even though some approaches for explanations have been introduced to solve some very niche explanation problems such approaches do not expose an appropriate level of information for humans to interpret decisions and explanation appropriately.

However, in some instances, no explanation can be provided by the models which may be a limitation for some applications.

SUMMARY

It is an object of one or more embodiments of the present technology to improve at least one of the limitations present in the prior art. One or more embodiments of the present technology may provide and/or broaden the scope of approaches to and/or methods of achieving the aims and objects of the present technology.

One or more embodiments of the present technology have been developed based on developers' appreciation that while recent graph predictions machine learning models provide accurate results, such models do not provide explanations with regard to how the decisions of the graph prediction models are made, which does not enable validating if the decisions can be trusted. For example, the graph predictions models may be graph classifiers, More specifically, developers have appreciated that in some contexts, such as in reasoning engines and recommendation systems applied in medicine and critical systems, an understanding of the behavior of the graph classification model is required to perform actions in consequence to the decisions, i.e. the "thinking" behind the prediction must be verified by an assessor, or by another machine-learning algorithm.

Thus, one or more embodiments of the present technology are directed to methods and systems for ranking subgraphs as potential explanations for graph classification.

In accordance with a broad aspect of the present technology, there is disclosed a method for ranking subgraphs as potential explanations for a labelled edge type class, the method being executed by a processor, the processor having access to a machine learning model having been trained to embed graphs. The method includes obtaining a first graph, the first graph being a first type of representation of a set of labelled digital items, each labelled digital item being represented as a respective entity node connected via at least one respective labelled edge type to a respective value node. The method includes obtaining a second graph, the second graph being a second type representation of relations in the set of labelled digital items, the second graph comprising at least one of a first edge type between a first entity node and a second entity node, a second edge type between a third entity node and a first value node, and a third edge type between a second value node and a third value node. The method includes generating a combined graph by merging the first graph and the second graph based on the at least one of the first edge type, the second edge type and the third edge type. obtaining a set of unlabelled digital items, each unlabelled digital item comprising at least one value. The method includes matching at least one unlabelled digital item to a respective subgraph of the combined graph to obtain a set of matched subgraphs, the respective subgraph being representative of at least a portion of the at least one unlabelled digital item. The method includes embedding, using the machine learning model, the combined graph to obtain a set of vectors encoding the combined graph in a multidimensional space. The method includes determining a respective expressivity score between a given vector corresponding to a respective labelled edge type in the combined graph, and a respective average vector corresponding to a respective matched subgraph of the set of matched subgraphs in the combined graph to obtain, for each respective labelled edge type, a respective subset of expressivity scores associated with respective matched subgraphs. The method includes ranking, based on the respective subset of expressivity scores, the respective matched subgraphs to obtain a ranked set of potential explanation subgraphs for the respective labelled edge type.

In one or more embodiments of the method, the method further includes providing, based on a respective position, a given subgraph of the ranked set of potential explanation subgraphs as a potential explanation for the respective labelled edge type.

In one or more embodiments of the method, the first entity node is the third entity node.

In one or more embodiments of the method, the first value node is the third value node.

In one or more embodiments of the method, the generating of the combined graph is based on at least one of a syntactic similarity between a portion of the first graph and a portion of the second graph, and a semantic similarity between the portion of the first graph and the portion of the second graph.

In one or more embodiments of the method, the method further includes, prior to the generating of the combined graph, embedding, using the machine learning model, the first graph to obtain a set of first graph vectors encoding the first graph. The method includes embedding, using the machine learning model, the second graph to obtain a set of second graph vectors encoding the second graph, and the generating of the combined graph is based on at least a subset of the first graph vectors encoding the first graph and at least a subset of the second graph vectors encoding the second graph.

In one or more embodiments of the method, the embedding of the first graph and the second graph includes encoding respective semantic features and respective syntactic features of the first graph and the second graph in the set of first graph vectors and the set of second graph vectors respectively.

In one or more embodiments of the method, the generating of the combined graph based on the syntactic similarity includes determining a similarity score between respective syntactic features of the subset of first graph vectors and the subset of second graph vectors. The generating of the combined graph based on the semantic similarity includes determining a similarity score between respective semantic features of the subset of first graph vectors and the subset of second graph vectors.

In one or more embodiments of the method, the method further includes, prior to the matching of the at least one unlabelled digital item to the respective subgraph embedding the set of unlabelled digital items to obtain a set of unlabelled vectors encoding the set of unlabelled digital items, and the matching of the at least one unlabelled digital item to the respective subgraph is based on at least one of respective semantic features and respective syntactic features of the set of unlabelled vectors and a subset of vectors corresponding to the subgraph.

In one or more embodiments of the method, the method further includes, prior to the determining of the respective expressivity score between the given vector corresponding to the respective edge type and the respective average vector corresponding to the respective matched subgraph, identifying, from the set of vectors, for each matched subgraph in the combined graph, a corresponding subset of vectors. The method includes calculating the respective average vector based on the corresponding subset of vectors.

In one or more embodiments of the method, the respective expressivity score is indicative of a proximity between the given vector and the respective average vector in the multidimensional space.

In one or more embodiments of the method, the method further includes, prior to the generating the first graph, obtaining the set of labelled digital items and parsing, using a graph generation machine learning model, the set of labelled digital items to generate the first graph.

In one or more embodiments of the method, a respective labelled edge type corresponds to a respective class in the set of labelled digital items.

In one or more embodiments of the method, the set of labelled digital items is represented as a table, each respective entity node is represented as a respective row in the table, each labelled edge type is represented as a respective column in the table, each respective value node connected to the respective entity node via the respective edge type is represented as a respective value of the respective line at the respective column.

In accordance with a broad aspect of the present technology, there is disclosed a system for ranking subgraphs as potential explanations for a labelled edge type class, the system comprising a processor, the processor having access to a machine learning model having been trained to embed graphs. The processor is operatively connected to a non-transitory storage medium comprising instructions, the processor, upon executing the instructions, is configured for obtaining a first graph, the first graph being a first type of representation of a set of labelled digital items, each labelled digital item being represented as a respective entity node connected via at least one respective labelled edge type to a respective value node. The processor is configured for obtaining a second graph, the second graph being a second type representation of relations in the set of labelled digital items, the second graph comprising at least one of a first edge type between a first entity node and a second entity node, a second edge type between a third entity node and a first value node and a third edge type between a second value node and a third value node. The processor is configured for generating a combined graph by merging the first graph and the second graph based on the at least one of the first edge type, the second edge type and the third edge type. The processor is configured for obtaining a set of unlabelled digital items, each unlabelled digital item comprising at least one value, and matching at least one unlabelled digital item to a respective subgraph of the combined graph to obtain a set of matched subgraphs, the respective subgraph being representative of at least a portion of the at least one unlabelled digital item. The processor is configured for embedding, using the machine learning model, the combined graph to obtain a set of vectors encoding the combined graph in a multidimensional space. The processor is configured for determining a respective expressivity score between a given vector corresponding to a respective labelled edge type in the combined graph, and a respective average vector corresponding to a respective matched subgraph of the set of matched subgraphs in the combined graph to obtain, for each respective labelled edge type, a respective subset of expressivity scores associated with respective matched subgraphs. The processor is configured for ranking, based on the respective subset of expressivity scores, each respective matched subgraphs to obtain a ranked set of potential explanation subgraphs for the respective labelled edge type.

In one or more embodiments of the system, the processor is further configured for providing, based on a respective position, a given subgraph of the ranked set of potential explanation subgraphs as a potential explanation for the respective labelled edge type.

In one or more embodiments of the system, the first entity node is the third entity node.

In one or more embodiments of the system, the first value node is the third value node.

In one or more embodiments of the system, the generating of the combined graph is based on at least one of a syntactic similarity between a portion of the first graph and a portion of the second graph, and a semantic similarity between the portion of the first graph and the portion of the second graph.

In one or more embodiments of the system, the processor is further configured for, prior to the generating of the combined graph, embedding, using the machine learning model, the first graph to obtain a set of first graph vectors encoding the first graph, and embedding, using the machine learning model, the second graph to obtain a set of second graph vectors encoding the second graph, and the generating of the combined graph is based on at least a subset of the first graph vectors encoding the first graph and at least a subset of the second graph vectors encoding the second graph.

In one or more embodiments of the system, the embedding of the first graph and the second graph includes encoding respective semantic features and respective syntactic features of the first graph and the second graph in the set of first graph vectors and the set of second graph vectors respectively.

In one or more embodiments of the system, the generating of the combined graph based on the syntactic similarity includes determining a similarity score between respective syntactic features of the subset of first graph vectors and the subset of second graph vectors, and the generating of the combined graph based on the semantic similarity includes determining a similarity score between respective semantic features of the subset of first graph vectors and the subset of second graph vectors.

In one or more embodiments of the system, the processor is further configured for, prior to the matching of the at least one unlabelled digital item to the respective subgraph, embedding the set of unlabelled digital items to obtain a set of unlabelled vectors encoding the set of unlabelled digital items, and the matching of the at least one unlabelled digital item to the respective subgraph is based on at least one of respective semantic features and respective syntactic features of the set of unlabelled vectors and a subset of vectors corresponding to the subgraph.

In one or more embodiments of the system, the processor is further configured for, prior to the determining of the respective expressivity score between the given vector corresponding to the respective edge type and the respective average vector corresponding to the respective matched subgraph, identifying, from the set of vectors, for each matched subgraph in the combined graph, a corresponding subset of vectors, and calculating the respective average vector based on the corresponding subset of vectors.

In one or more embodiments of the system, the respective expressivity score is indicative of a proximity between the given vector and the respective average vector in the multidimensional space.

In one or more embodiments of the system, the processor is further configured for, prior to the generating of the first graph obtaining the set of labelled digital items, and parsing, using a graph generation machine learning model, the set of labelled digital items to generate the first graph.

In one or more embodiments of the system, a respective labelled edge type corresponds to a respective class in the set of labelled digital items.

In one or more embodiments of the system, the set of labelled digital items is represented as a table, each respective entity node is represented as a respective row in the table, each labelled edge type is represented as a respective column in the table, each respective value node connected to the respective entity node via the respective edge type is represented as a respective value of the respective line at the respective column.

DEFINITIONS

Graph

Graphs are mathematical structures used to model pairwise relations between objects. A graph is composed of vertices (also known as nodes or points) which are connected by edges (also known as links or lines). A graph may be a directed graph, where edges have an associated direction, or an undirected graph where edges do not have an associated direction.

Machine Learning (ML) Models

A machine learning (ML) algorithm is a process or sets of procedures that helps a mathematical model adapt to data given an objective. A ML algorithm normally specifies the way the feedback is used to enable the model to learn the appropriate mapping from input to output. The model specifies the mapping function and holds the parameters while the learning algorithm updates the parameters to help the model satisfy the objective.

ML may generally be divided into broad categories such as supervised learning, unsupervised learning and reinforcement learning. Supervised learning involves presenting a machine learning model with training data consisting of inputs and outputs labelled by assessors, where the objective is to train the machine learning model such that it learns a general rule for mapping inputs to outputs. Unsupervised learning involves presenting the machine learning model with unlabeled data, where the objective is for the machine learning model to find a structure or hidden patterns in the data. Reinforcement learning involves having an algorithm evolving in a dynamic environment guided only by positive or negative reinforcement.

Non-limiting examples of ML models include neural networks (including deep learning (DL) neural networks), decision trees, support vector machines (SVMs), Bayesian networks, and genetic algorithms.

Neural Networks (NNs)

Neural networks (NNs), also known as artificial neural networks (ANNs) are a class of non-linear models mapping from inputs to outputs and comprised of layers that can potentially learn useful representations for predicting the outputs. Neural networks are typically organized in layers, which are made of a number of interconnected nodes that contain activation functions. Patterns may be presented to the network via an input layer connected to hidden layers, and processing may be done via the weighted connections of nodes. The answer is then output by an output layer connected to the hidden layers. Non-limiting examples of neural networks includes: perceptrons, back-propagation, hopfield networks.

Multilayer Perceptron (MLP)

A multilayer perceptron (MLP) is a class of feedforward artificial neural networks. A MLP consists of at least three layers of nodes: an input layer, a hidden layer and an output layer. Except for the input nodes, each node is a neuron that uses a nonlinear activation function. A MLP uses a supervised learning technique called backpropagation for training. A MLP can distinguish data that is not linearly separable.

Convolutional Neural Network (CNN)

A convolutional neural network (CNN or ConvNet) is a NN which is a regularized version of a MLP. A CNN uses convolution in place of general matrix multiplication in at least one layer.

Recurrent Neural Network (RNN)

A recurrent neural network (RNN) is a NN where connection between nodes form a directed graph along a temporal sequence. This allows it to exhibit temporal dynamic behavior. Each node in a given layer is connected with a directed (one-way) connection to every other node in the next successive layer. Each node (neuron) has a time-varying real-valued activation. Each connection (synapse) has a modifiable real-valued weight. Nodes are either input nodes (receiving data from outside the network), output nodes (yielding results), or hidden nodes (that modify the data en route from input to output).

Gradient Boosting

Gradient boosting is one approach to building an ML model based on decision trees, whereby a prediction model in the form of an ensemble of trees is generated. The ensemble of trees is built in a stage-wise manner. Each subsequent decision tree in the ensemble of decision trees focuses training on those previous decision tree iterations that were "weak learners" in the previous iteration(s) of the decision trees ensemble (i.e. those that are associated with poor prediction/high error).

Generally speaking, boosting is a method aimed at enhancing prediction quality of the ML model. In this scenario, rather than relying on a prediction of a single trained algorithm (i.e. a single decision tree) the system uses many trained algorithms (i.e. an ensemble of decision trees), and makes a final decision based on multiple prediction outcomes of those algorithms.

In boosting of decision trees, the ML model first builds a first tree, then a second tree, which enhances the prediction outcome of the first tree, then a third tree, which enhances the prediction outcome of the first two trees and so on. Thus, the ML model in a sense is creating an ensemble of decision trees, where each subsequent tree is better than the previous, specifically focusing on the weak learners of the previous iterations of the decision trees. Put another way, each tree is built on the same training set of training objects, however training objects, in which the first tree made "mistakes" in predicting are prioritized when building the second tree, etc. These "tough" training objects (the ones that previous iterations of the decision trees predict less accurately) are weighted with higher weights than those where a previous tree made satisfactory prediction.

Examples of deep learning ML models include: Deep Boltzmann Machine (DBM), Deep Belief Networks (DBN), Convolutional Neural Network (CNN), and Stacked Auto-Encoders.

Examples of ensemble ML models include: Random Forest, Gradient Boosting Machines (GBM), Boosting, Bootstrapped Aggregation (Bagging), AdaBoost, Stacked Generalization (Blending), and Gradient Boosted Regression Trees (GBRD).

Examples of NN ML models include: Radial Basis Function Network (RBFN), Perceptron, Back-Propagation, and Hopfield Network Examples of Regularization ML models include: Ridge Regression, Least Absolute Shrinkage and Selection Operator (LASSO), Elastic Net, and Least Angle Regression (LARS).

Examples of Rule system ML models include: Cubist, One Rule (OneR), Zero Rule (ZeroR), and Repeated Incremental Pruning to Produce Error Reduction (RIPPER).

Examples of Regression ML models include: Linear Regression, Ordinary Least Squares Regression (OLSR), Stepwise Regression, Multivariate Adaptive Regression Splines (MARS), Locally Estimated Scatterplot Smoothing (LOESS), and Logistic Regression.

Examples of Bayesian ML models include: Naive Bayes, Averaged One-Dependence Estimators (AODE), Bayesian Belief Network (BBN), Gaussian Naive Bayes, Multinomial Naive Bayes, and Bayesian Network (BN).

Examples of Decision Trees ML models include: Classification and Regression Tree (CARD), Iterative Dichotomiser 3 (103), C4.5, C5.0, Chi-squared Automatic Interaction Detection CCHAID), Decision Stump, Conditional Decision Trees, and M5.

Examples of Dimensionality Reduction ML models include: Principal Component Analysis (PCA), Partial Least Squares Regression (PLSR), Sammon Mapping, Multidimensional Scaling (MDS), Projection Pursuit, Principal Component Regression (PCR), Partial Least Squares Discriminant Analysis, Mixture Discriminant Analysis (MDA), Quadratic Discriminant Analysis (QDA), Regularized Discriminant Analysis (RDA), Flexible Discriminant Analysis (FDA), and Linear Discriminant Analysis (LOA).

Examples of Instance Based ML models include: k-Nearest Neighbour (kNN), Learning Vector Quantization (LVQ), Self-Organizing Map (SOM), Locally Weighted Learning (LWL).

Examples of Clustering ML models include: k-Means, k-Medians, Expectation Maximization, and Hierarchical Clustering.

In the context of the present specification, the terms "an aspect," "an embodiment," "embodiment," "embodiments," "the embodiment," "the embodiments," "one or more embodiments," "some embodiments," "certain embodiments," "one embodiment," "another embodiment" and the like mean "one or more (but not all) embodiments of the present technology," unless expressly specified otherwise. A reference to "another embodiment" or "another aspect" in describing an embodiment does not imply that the referenced embodiment is mutually exclusive with another embodiment (e.g., an embodiment described before the referenced embodiment), unless expressly specified otherwise.

In the context of the present specification, a "server" is a computer program that is running on appropriate hardware and is capable of receiving requests (e.g., from electronic devices) over a network (e.g., a communication network), and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expressions "at least one server" and "a server".

In the context of the present specification, "electronic device" is any computing apparatus or computer hardware that is capable of running software appropriate to the relevant task at hand. Thus, some (non-limiting) examples of electronic devices include general purpose personal computers (desktops, laptops, netbooks, etc.), mobile computing devices, smartphones, and tablets, and network equipment such as routers, switches, and gateways. It should be noted that an electronic device in the present context is not precluded from acting as a server to other electronic devices. The use of the expression "an electronic device" does not preclude multiple electronic devices being used in receiving/sending, carrying out or causing to be carried out any task or request, or the consequences of any task or request, or steps of any method described herein. In the context of the present specification, a "client device" refers to any of a range of end-user client electronic devices, associated with a user, such as personal computers, tablets, smartphones, and the like.

In the context of the present specification, the expression "computer readable storage medium" (also referred to as "storage medium" and "storage") is intended to include non-transitory media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document may include the document itself (i.e. its contents), or it may be a unique document descriptor identifying a file with respect to a particular file system, or some other means of directing the recipient of the indication to a network location, memory address, database table, or other location where the file may be accessed. As one skilled in the art will appreciate, the degree of precision required in such an indication depends on the extent of any prior understanding about the interpretation to be given to information being exchanged as between the sender and the recipient of the indication. For example, if it will be appreciated that prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the expression "communication network" is intended to include a telecommunications network such as a computer network, the Internet, a telephone network, a Telex network, a TCP/IP data network (e.g., a WAN network, a LAN network, etc.), and the like. The term "communication network" includes a wired network or direct-wired connection, and wireless media such as acoustic, radio frequency (RF), infrared and other wireless media, as well as combinations of any of the above.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it will be appreciated that, the use of the terms "server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It will be appreciated that some aspects of the present technology that have resulted from attempting to attain the above-mentioned object may not satisfy this object and/or may satisfy other objects not specifically recited herein.

Additional and/or alternative features, aspects and advantages of implementations of one or more embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
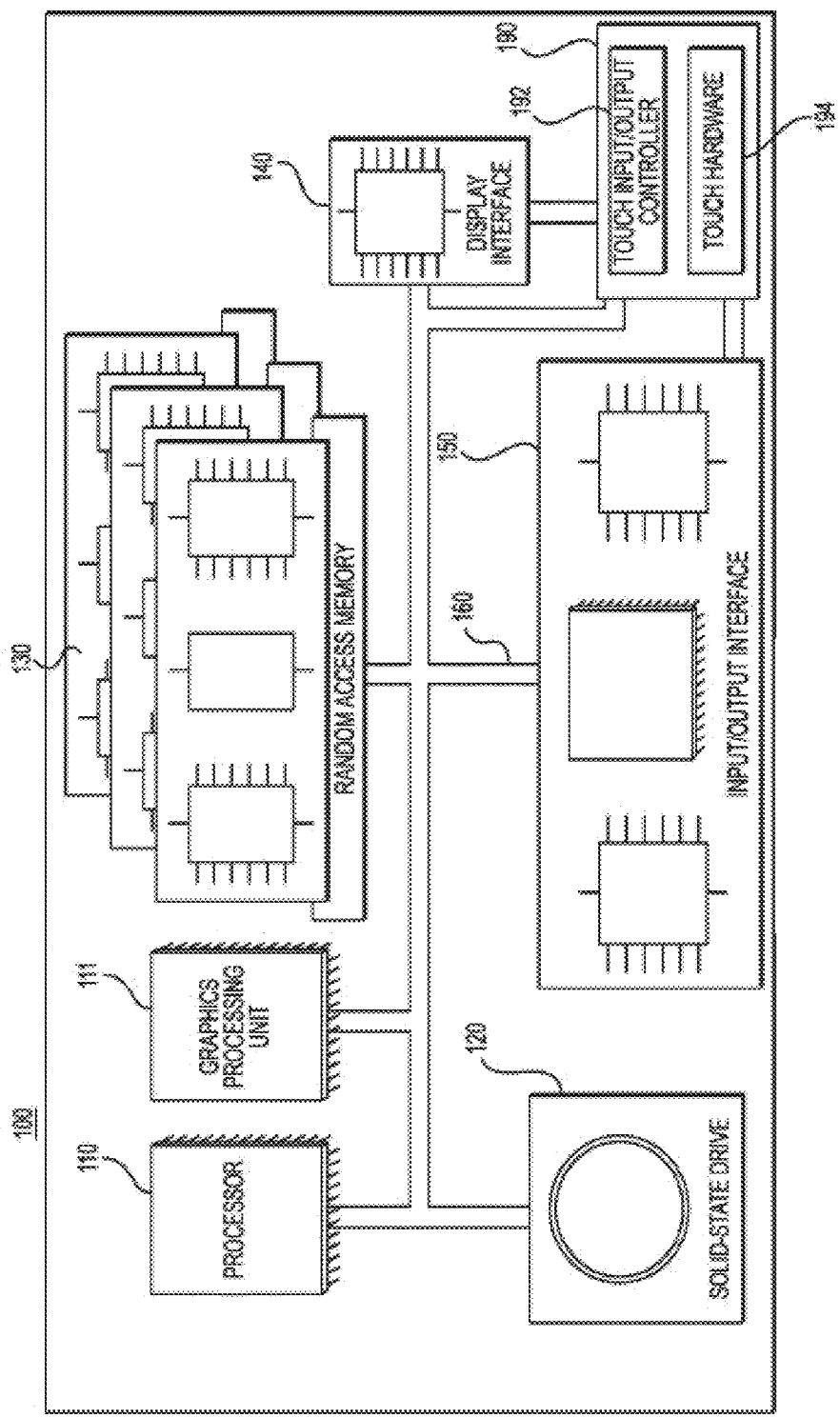
FIG. 1 depicts a schematic diagram of an electronic device in accordance with one or more non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology.

Furthermore, as an aid to understanding, the following description may describe relatively simplified implementations of the present technology. As a person skilled in the art will appreciate, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by the skilled addressee that any block diagram herein represents conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some non-limiting embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, some non-limiting examples will now be considered to illustrate various implementations of aspects of the present technology.

Electronic Device

Now referring to FIG. 1, there is shown an electronic device 100 suitable for use with one or more implementations of the present technology, the electronic device 100 comprises various hardware components including one or more single or multi-core processors collectively represented by processor 110, a graphics processing unit (GPU) 111, a solid-state drive 120, a random access memory 130, a display interface 140, and an input/output interface 150.

Communication between the various components of the electronic device 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled.

The input/output interface 150 may be coupled to a touchscreen 190 and/or to the one or more internal and/or external buses 160. The touchscreen 190 may be part of the display. In one or more embodiments, the touchscreen 190 is the display. The touchscreen 190 may equally be referred to as a screen 190. In the embodiment illustrated in FIG. 1, the touchscreen 190 comprises touch hardware 194 (e.g., pressure-sensitive cells embedded in a layer of a display allowing detection of a physical interaction between a user and the display) and a touch input/output controller 192 enabling communication with the display interface 140 and/or the one or more internal and/or external buses 160. In one or more embodiments, the input/output interface 150 may be connected to a keyboard (not shown), a mouse (not shown) or a trackpad (not shown) enabling the user to interact with the electronic device 100 in addition or in replacement of the touchscreen 190.

According to one or more implementations of the present technology, the solid-state drive 120 stores program instructions suitable for being loaded into the random-access memory 130 and executed by the processor 110 and/or the GPU 111 for link prediction explainability in the knowledge graph. For example, the program instructions may be part of a library or an application.

It will be appreciated that the electronic device 100 may be implemented as a server, a desktop computer, a laptop computer, a tablet, a smartphone, a personal digital assistant or any device that may be configured to implement the present technology, as it may be appreciated by a person skilled in the art.

System

Figure 2:
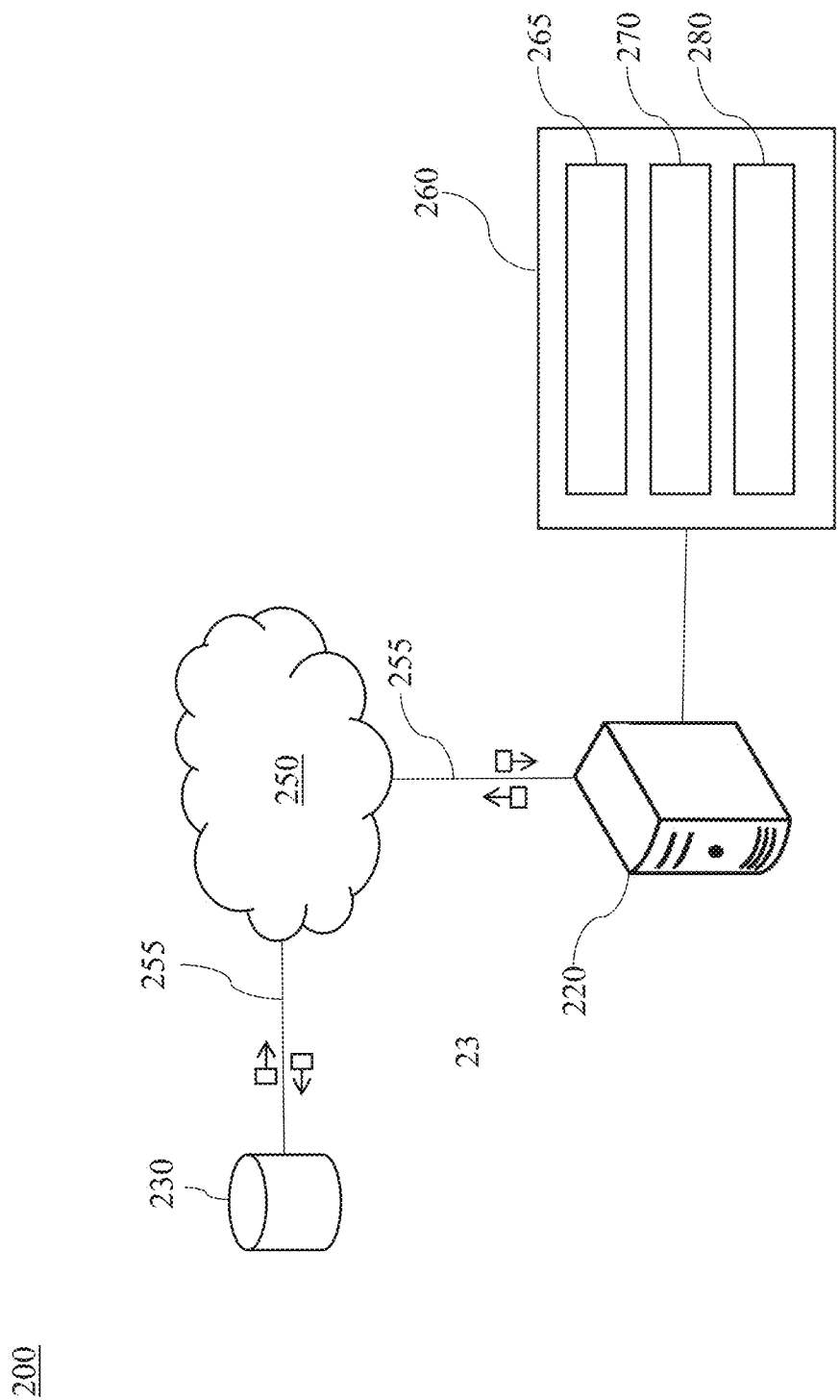
FIG. 2 depicts a schematic diagram of a system in accordance with one or more non-limiting embodiments of the present technology.

Now referring to FIG. 2, there is shown a schematic diagram of a system 200, the system 200 being suitable for implementing one or more non-limiting embodiments of the present technology. It will be appreciated that the system 200 as shown is merely an illustrative implementation of the present technology. Thus, the description thereof that follows is intended to be only a description of illustrative examples of the present technology. In some cases, what are believed to be helpful examples of modifications to the system 200 may also be set forth below. This is done merely as an aid to understanding, and, again, not to define the scope or set forth the bounds of the present technology. These modifications are not an exhaustive list, and, as a person skilled in the art will understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art will appreciate, this is likely not the case. In addition, it will be appreciated that the system 200 may provide in certain instances simple implementations of one or more embodiments of the present technology, and that where such is the case they have been presented in this manner as an aid to understanding.

The system 200 comprises inter alia a server 220 and a database 230, communicatively coupled over a communications network 250 via respective communication links 255.

Server

The server 220 is configured to inter alia: (i) access one or more of the set of ML models 260; (ii) obtain a set of labelled digital items; (iii) obtain a set of unlabelled digitals items; (iv) generate a graph representation of the set of labelled digital items; (v) merge graph representations to obtain a combined graph representation; (vi) match unlabelled digital items to subgraphs of the combined graph representation; and (vii) rank matched subgraphs as potential explanations for a given labelled edge type class.

How the server 220 is configured to do so will be explained in more detail herein below.

It will be appreciated that the server 220 can be implemented as a conventional computer server and may comprise at least some of the features of the electronic device 100 shown in FIG. 1. In a non-limiting example of one or more embodiments of the present technology, the server 220 is implemented as a Dell™ PowerEdge™ Server running the Microsoft™ Windows Server™ operating system. Needless to say that the server 220 may be implemented in any other suitable hardware and/or software and/or firmware or a combination thereof. In the disclosed non-limiting embodiment of present technology, the server 220 is a single server. In one or more alternative non-limiting embodiments of the present technology, the functionality of the server 220 may be distributed and may be implemented via multiple servers (not shown).

It will be appreciated that the implementation of the server 220 is well known to the person skilled in the art. However, the server 220 comprises a communication interface (not shown) configured to communicate with various entities (such as the database 230, for example and other devices potentially coupled to the communication network 250) via the network. The server 220 further comprises at least one computer processor (e.g., the processor 110 of the electronic device 100) operationally connected with the communication interface and structured and configured to execute various processes to be described herein.

Set of Machine Learning (ML) Models

The server 220 has access to a set of ML models 260.

The set of ML models 260 include inter alia a graph generation ML model 265, a first graph embedding ML model 270, and a second graph embedding ML model 280.

The graph generation ML model 265 is configured to generate a graph from a collection of digital items. In one or more embodiments, the graph generation ML model 265 has been trained to generate a graph representation of a collection of digital items including character sequences and/or images, which may be at least in part in a semi-structured format such as a table.

A given digital item includes character-based content, where a given sequence of characters is associated with one or more other sequences characters, from which relations can be defined and which can be represented as a graph. As a non-limiting example, the digital item and its associated information may be represented as nodes in a subgraph, and a plurality of digital items may be presented as a graph.

It will be appreciated that "text-based" content does not intend to mean that the given digital item only contains text to the exclusion of other type of multi-media elements.

A given digital item may be said to be a labelled digital item when the information the digital item is associated with has one or more labels, annotations or tags which are indicative of a category or class of the digital item and/or its associated information. The label, annotation or tag of the information associated with the digital item may have been determined by an assessor or by computer model such as a machine learning model. As a non-limiting example, the digital item and its associated information may be represented as nodes in a subgraph, and the labelled information may represent the types of edges in the graph.

An unlabelled digital item is similar to a labelled digital item, but the information associated with the digital item does not have one or more labels, annotations or tags, i.e. the relation between the digital item and its associated information is not known.

In one or more embodiments, digital items may be represented in semi-structured form, such as in a table part of database, or may be represented as one or more digital files.

In one or more embodiments, digital items may be represented in the form of a table comprising rows and columns, where a given digital item is a row and values corresponding to one or more columns represent the information associated with the given digital item. In one or more alternative embodiments, the digital items may include a natural language text. In one or more other embodiments, the digital items may include images.

As a non-limiting example, digital items may include medical records of patients, where a given digital item may represent a given patient with patient information including name, age, sex, weight, size, diseases, and the like, and where the patient information is labelled or annotated with the type and severity of diseases.

As another non-limiting example, digital items may include mortgage applications, and a given digital item may be a mortgage application of a given person with labelled information such as applicant profile, interest rate, status of application, and the like.

As yet another non-limiting example, digital items may include internet profiles of users, such as social media pages. As yet another non-limiting example, digital items may include different components of a system such as a vehicle and different parameters associated with the components.

The graph generation ML model 265 is configured to parse one or more digital items having associated information to generate a graph representation thereof.

In one or more embodiments, the graph generation ML model 265 implements natural language processing (NLP) techniques and may perform preprocessing of digital items including tokenizing and tagging, named entity recognition, relation extraction and triple generation.

In one or more embodiments, the graph generation ML model 265 has been trained to generate a graph representation in the form of a set of triples comprising a head entity corresponding to a first node, a tail entity corresponding to a second node and a predicate corresponding to a relation type between the first node and the second node. In one or more embodiments, a given triple may be represented as an entity connected to a property value via a property edge type. As a non-limiting example, the graph generation ML model 265 may include txt2rdf, rdb2rdf and the like.

The first graph embedding ML model 270 is configured to generate vectors or embeddings from a graph received as an input. The first graph embedding ML model 270 encodes entities and relations of acknowledge graph 235 in a continuous low-dimensional vector space or embedding space so as to perform various machine learning tasks. As a non-limiting example, a graph may be encoded by the first graph embedding ML model 270 as a set of vectors, a matrix, or a tensor.

In one or more embodiments, the first graph embedding ML model 270 has been trained to encode synctactic features and semantic features of a graph.

It will be appreciated that in one or more other embodiments, the first graph embedding ML model 270 may represent different substructures of the knowledge graph 235, i.e. a given vector may represent one of a node, an edge, and a subgraph of the knowledge graph 235. In one or more alternative embodiments, the first graph embedding ML model 270 may be trained to embed knowledge graphs using character embedding and word embedding techniques.

In one or more embodiments, the first graph embedding ML model 270 is a deep learning model. Additionally, the first graph embedding ML model 270 may comprise one or more CNNs to perform graph encoding.

As a non-limiting example, the first graph embedding ML model 270 may be implemented as and/or comprise a deep gaussian embedding model (arXiv:1707.03815), a convolutional 2d knowledge graph model, and a reversed graph embedding model.

The second graph embedding ML model 280 is similar to the first graph embedding ML model 270, i.e. the second graph embedding ML model 280 is configured to generate vectors of a graph received as an input and encode entities and relations of the knowledge graph 235.

In one or more embodiments, the second graph embedding ML model 280 may be configured differently from the first graph embedding ML model 270, e.g. have a different underlying model and/or use different features when generating vectors. The second graph embedding ML model 280 is configured to generate vectors which encode synctactic features and/or semantic features of a graph and which enable calculating similarities between a given element of a graph such as a node, edge or combination thereof and another given element of the graph.

In one or more alternative embodiments, the second graph embedding ML model 280 is optional and may be replaced by the first graph embedding ML model 270.

In one or more embodiments, the server 220 may execute one or more of the set of ML models 260. In one or more other embodiments, one or more of the set of ML models 260 may be executed by another server (not depicted), and the server 220 may access the one or more of the set of ML models 260 for training or for use by connecting to the server (not shown) via an API (not depicted), and specify parameters of the one or more of the set of MLAs, transmit data to and/or receive data from the one or more of the set of ML models 260, without directly executing the one or more of the set of ML models 260.

As a non-limiting example, one or more of the set of ML models 260 may be hosted on a cloud service providing a machine learning API. Non-limiting examples of such services include Amazon™ machine learning API, BigML™, PredictionIO™ Google Cloud™ API, IBM™ Watson™ Discovery API, Kairos™ API, Microsoft™ Azure™ Cognitive Services, Prediction™ 10, and TensorFlow™ API.

Database

A database 230 is communicatively coupled to the server 220 via the communications network 250 but, in one or more alternative implementations, the database 230 may be communicatively coupled to the server 220 without departing from the teachings of the present technology. Although the database 230 is illustrated schematically herein as a single entity, it will be appreciated that the database 230 may be configured in a distributed manner, for example, the database 230 may have different components, each component being configured for a particular kind of retrieval therefrom or storage therein.

The database 230 may be a structured collection of data, irrespective of its particular structure or the computer hardware on which data is stored, implemented or otherwise rendered available for use. The database 230 may reside on the same hardware as a process that stores or makes use of the information stored in the database 230 or it may reside on separate hardware, such as on the server 220. The database 230 may receive data from the server 220 for storage thereof and may provide stored data to the server 220 for use thereof.

In one or more embodiments of the present technology, the database 230 is configured to inter alia: (i) store sets of labelled and unlabelled digital items; (ii) store graph representations of digital items in the form of triples; (iii) store graph vectors using the set of ML models 260; and (iv) store subgraphs, similarity scores and expressivity scores between graph vectors.

Communication Network

In one or more embodiments of the present technology, the communications network 250 is the Internet. In one or more alternative non-limiting embodiments, the communication network 250 may be implemented as any suitable local area network (LAN), wide area network (WAN), a private communication network or the like. It will be appreciated that implementations for the communication network 250 are for illustration purposes only. How a communication link 255 (not separately numbered) between the server 220, the database 230, and/or another electronic device (not shown) and the communications network 250 is implemented will depend inter alia on how each electronic device is implemented.

Ranked Explanation Generation Procedure

Figure 3:
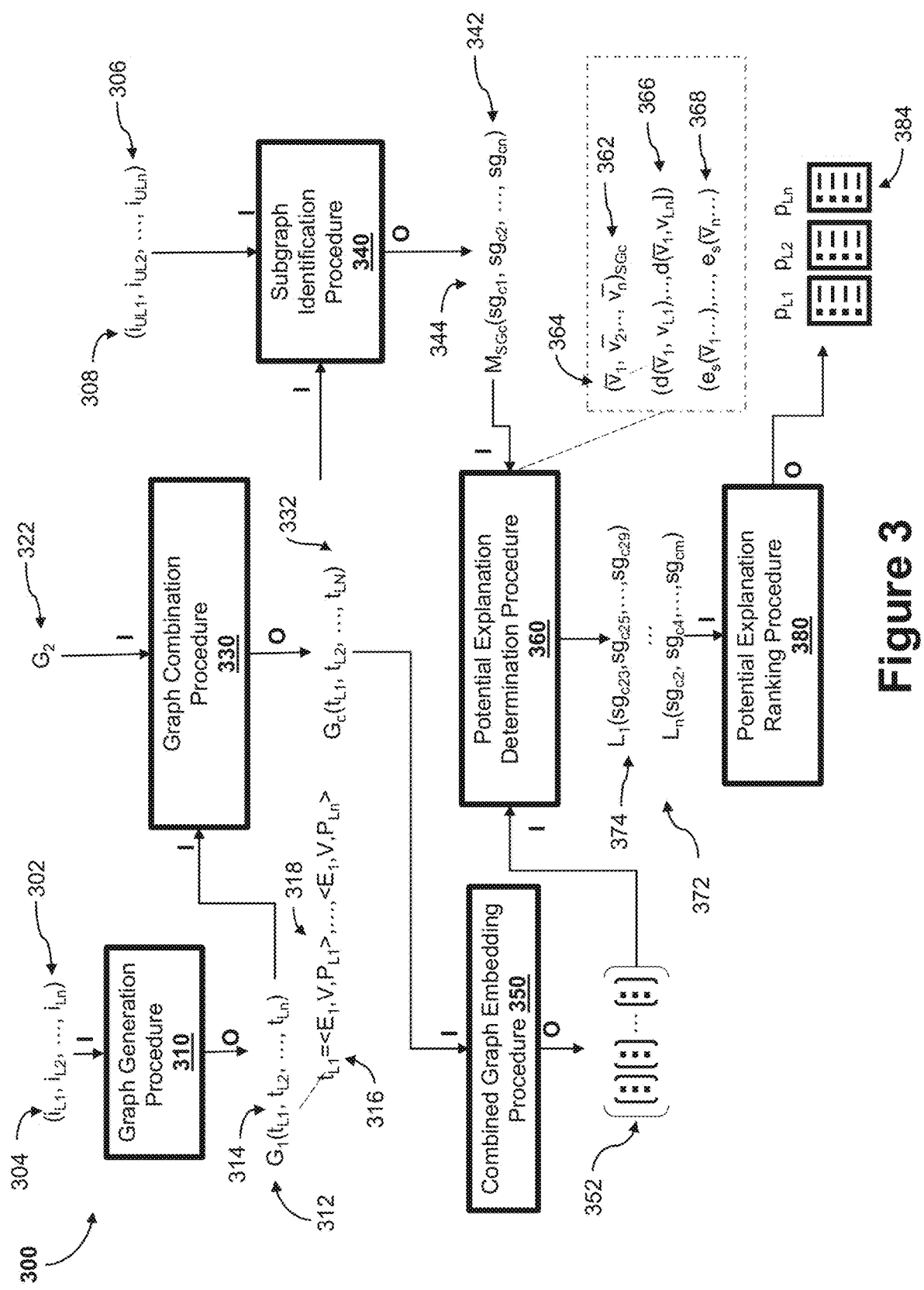
FIG. 3 depicts a schematic diagram of a ranked explanation generation procedure for one or more labelled edge types in accordance with one or more non-limiting embodiments of the present technology.

With reference to FIG. 3, there is shown a schematic diagram of a ranked explanation generation procedure 300 for one or more labelled edge types in accordance with one or more non-limiting embodiments of the present technology.

The ranked explanation generation procedure 300 comprises inter alia a graph generation procedure 310, a graph combination procedure 330, a subgraph identification procedure 340, a combined graph embedding procedure 350, a potential explanation determination procedure 360, and a potential explanation ranking procedure 380.

In one or more embodiments of the present technology, the server 220 executes the ranked explanation generation procedure 300. In alternative embodiments, the server 220 may execute at least a portion of the ranked explanation generation procedure 300, and one or more other servers (not shown) may execute other portions of the explainable link prediction generation procedure.

The ranked explanation generation procedure 300 is configured to generate potential explanations for graph classification tasks in the form of ranked subgraphs for each labelled class corresponding to an edge type.

Graph Generation Procedure

The graph generation procedure 310 is configured to inter alia: (i) obtain the set of labelled digital items 302; (ii) generate, based on the set of labelled digital items 302, a first graph 312.

The graph generation procedure 310 obtains the set of labelled digital items 302. The graph generation procedure 310 obtains set of labelled digital items 302 from the database 230. In one or more alternative embodiments, the graph generation procedure 310 obtains the set of labelled digital items 302 from another electronic device.

In one or more embodiments, the set of labelled digital items 302 is in the form of a table comprising rows and columns. In one or more other embodiments, the set of labelled digital items is in semi-structured form. As a non-limiting example, the set of labelled digital items 302 may comprise medical records of patients, mortgage applications comprising profile and status, and the like. As a non-limiting example, the set of labelled digital items 302 may be one or more digital documents comprising text, a web page, a portion of a database, and the like.

Each labelled digital item 304 of the set of labelled digital items 302 includes or is associated with one or more values having respective labels or classes. In one or more embodiments, each labelled digital item 304 of the set of labelled digital items 302 comprises one or more sequences of characters. As a non-limiting example, the set of labelled digital items 302 may have been labelled by a human operator or extracted from an online collection of data.

The graph generation procedure 310 parses the set of labelled digital items 302 and generates a first graph 312. In one or more embodiments, the graph generation procedure 310 has access to the graph generation ML model 265 for generating the first graph 312. It will be appreciated that the graph generation procedure 310 may use various techniques known in the art for generating a graph from an unstructured or semi-structured collection of data to obtain the first graph 312.

The first graph 312 comprises a first set of nodes connected by a first set of edges, which may be represented as a set of first graph triples.

In one or more embodiments, the graph generation procedure 310 generates the first graph 312 in the form of the set of first graph triples, where each first graph triple 316 comprises an entity node E connected to a property value node V via a property edge type P. In one or more embodiments, where the set of labelled digital items 302 is in the form of a table, each line of the table corresponding to a labelled digital item 304 is represented as a node entity E, each column is represented as a labelled edge type property P, and a respective value for a given column is represented as a value node V. Thus, each labelled digital item 304 is represented as a respective subset of triples 314 <E,V,P>, where the number of triples in the subset of first graph triples corresponds to the number of columns in the table.

As a non-limiting example, for a table having three (3) columns X Y Z, the labelled digital item corresponding to the first row may be represented as a first entity node E1 and the subset of triples for the first entity node may be <E1,X,a1><E1,Y,b1><E1,Z,c1>, where a1 is the value of the node E1 at column X, b1 is the value of the node E1 at column Y and c1 is the value of the node E1 at column Z which form a portion of the first graph 312.

The graph generation procedure 310 generates the first graph 312 in the form of the set of first graph triples for the set of labelled digital items 302, each labelled digital item 304 corresponding to a respective subset of first graph triples 314.

Figure 4:
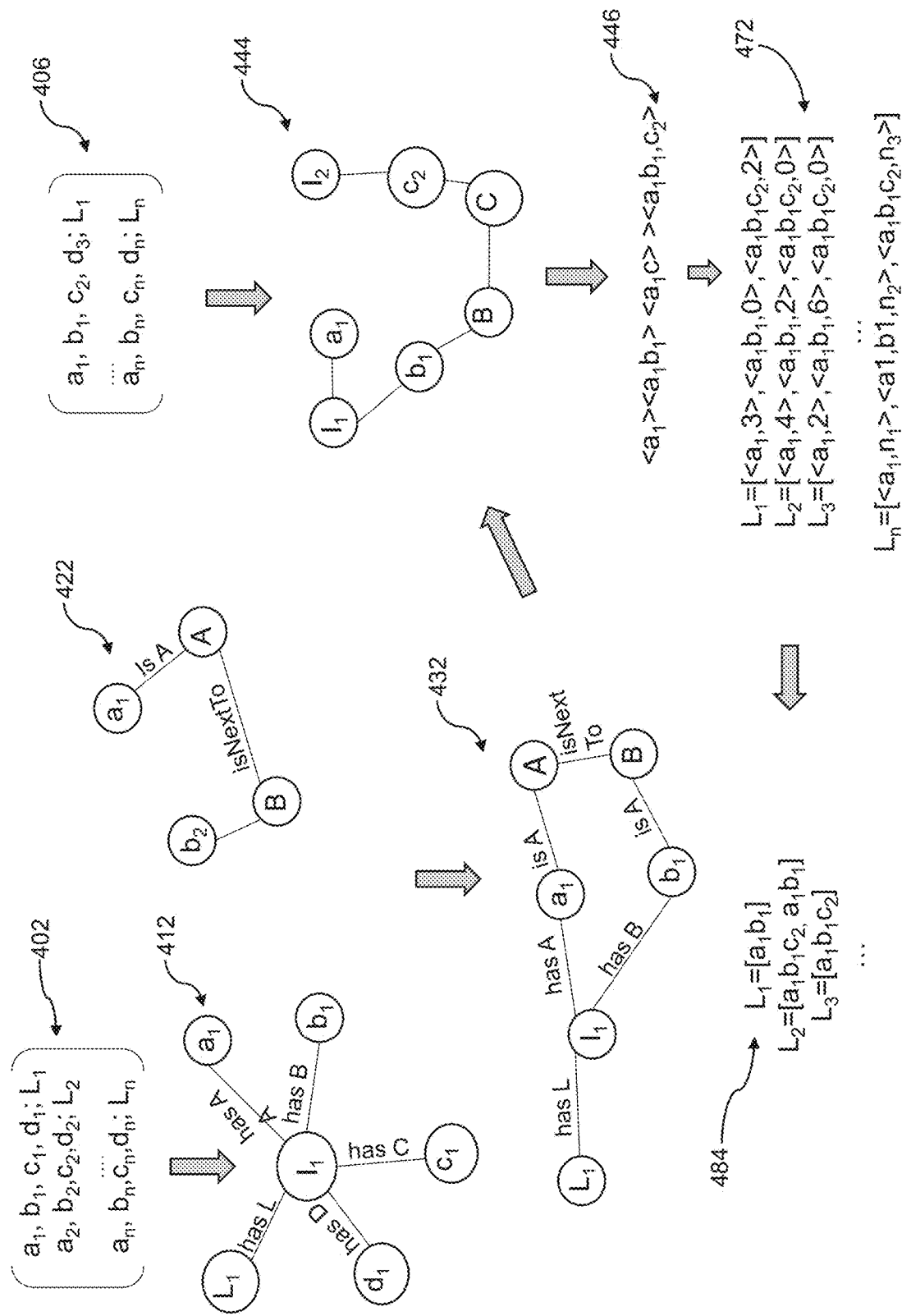
FIG. 4 depicts a schematic diagram of non-limiting examples of inputs and outputs of the ranked explanation generation procedure of FIG. 3 in accordance with one or more non-limiting embodiments of the present technology.

With brief reference to FIG. 4, there is depicted a non-limiting example of the set of labelled digital items 302 as a set of labelled digital items 402 and the first graph 312 as a first graph 412 in accordance with one or more non-limiting embodiments of the present technology.

The graph generation procedure 310 outputs the first graph 312 in the form of the set of first graph triples.

Graph Combination Procedure

The graph combination procedure 330 is configured to inter alia: (i) obtain the first graph 312; (ii) obtain the second graph 322; and (iii) generate a combined graph based on the first graph 312 and the second graph 322.

The graph combination procedure 330 obtains the first graph 312 output by the graph generation procedure 310. The first graph 312 is represented as the set of first graph triples. In one or more embodiments, the graph combination procedure 330 obtains the first graph 312 from the database 230 or another electronic device (i.e. the graph generation procedure 310 and graph combination procedure 330 may be performed by different devices)

The graph combination procedure 330 obtains the second graph 322. In one or more embodiments, the graph combination procedure 330 obtains the second graph 322 from the database 230. The second graph 322 is represented as a set of second graph triples. The second graph 322 is a structured representation of the domain in which set of labelled digital items 302 has been obtained. As a non-limiting example, the second graph 322 may be an ontology capturing the semantic representation of terms, relations and/or entities present in the set of labelled digital items 302, a taxonomy of the set of labelled digital items 302, constraints modeled as rules, a knowledge graph, and the like.

The second graph 322 describes at least one of: a first edge type between a first entity node and a second entity node in the first graph 312, a second edge type between a third entity node and a first value node in the first graph 312, and a third edge type between a second value node and a third value node in the first graph 312. The second graph 322 thus describes at least one type of relation between given elements in the first graph 312.

With brief reference to FIG. 4, there is depicted a non-limiting example of the second graph 322 as a second graph 422 in accordance with one or more non-limiting embodiments of the present technology.

The purpose of the graph combination procedure 330 is to merge corresponding elements in the first graph 312 and the second graph 322 to obtain a single graph representation in the form of the combined graph 332.

The graph combination procedure 330 merges the first graph 312 and the second graph 322 to obtain a combined graph 332 based on at least a portion of the first graph 312 and at least a portion of the second graph 322. It will be appreciated that a portion of a graph may be an element of the graph such as a node including entity nodes and node property value, an edge including labelled edge types, or a combination thereof.

In one or more embodiments, the graph combination procedure 330 merges a given element from the first graph 312 to a given element from the second graph 322 based on at least one of: a syntactic similarity between the given elements and a semantic similarity between the given elements.

In one or more embodiments, the graph combination procedure 330 has access to an embedding ML model such as the second graph embedding ML model 280 to embed the first graph 312 to generate a set of first graph vectors and the second graph 322 to generate a set of second graph vectors. The set of first graph vectors encodes the first graph in a multidimensional space and represents at least one of syntactic features and semantic features of the first graph 312. The set of second graph vectors encodes the second graph in a multidimensional space and represents at least one of syntactic features and semantic features of the second graph.

The graph combination procedure 330 determines a similarity between one or more of the set of first graph vectors and the set of second graph vectors to merge corresponding portions of the first graph 312 and the second graph 322 to generate the combined graph 332.

In one or more embodiments, the graph combination procedure 330 determines a syntactic similarity based on a textual representations of elements in the first graph 312 and the second graph 322. It will be appreciated that the textual representations of the elements of the first graph 312 and the second graph 322 may be extracted using techniques known in the art, such as natural language processing (NLP) techniques.

In one or more embodiments, the graph combination procedure 330 determines a semantic similarity of two nodes based on a number of connected edges. In one or more embodiments, the number of connected edges needs to be above a predetermined threshold of connected edges to be determined to be semantically similar by the graph combination procedure 330.

In one or more embodiments, the semantic similarity comprises: a class or concept similarity, i.e. two concepts have similar or equivalent meanings, or a property or attribute similarity: two edge types or properties having similar or equivalent meanings.

The graph combination procedure 330 generates the combined graph 332, where the combined graph 332 is represented as a set of combined graph triples.

With brief reference to FIG. 4, there is depicted a non-limiting example of the combined graph 332 as a combined graph 432 having been generated based on at least a portion of a first graph 412 and at least a portion of a second graph 422 in accordance with one or more non-limiting embodiments of the present technology.

The graph combination procedure 330 outputs the combined graph 332.

Combined Graph Embedding Procedure

The combined graph embedding procedure 350 is configured to inter alia: (i) obtain the combined graph 332; and (ii) generate a set of combined graph vectors 352 based on the combined graph 332.

The combined graph embedding procedure 350 obtains the combined graph 332 output by the graph combination procedure 330.

In one or more embodiments, the combined graph embedding procedure 350 obtains the combined graph 332 from the database 230.

The combined graph embedding procedure 350 has access to a first graph embedding ML model 270 having been trained to generate graph embeddings. The combined graph embedding procedure 350 provides the combined graph 332 to the first graph embedding ML model 270 to obtain the set of combined graph vectors 352.

The set of combined graph vectors 352 encodes the combined graph 332 in a continuous low-dimensional vector space or embedding space. The set of combined graph vectors 352 encodes syntactic features and semantic features of the combined graph 332. Each combined graph vector is computed by measuring the impact or contribution of the represented element on the robustness of the combined graph 332.

The set of combined graph vectors 352 thus encodes nodes including entity nodes and property value nodes, and edge types including property value edge types of the combined graph 332.

The combined graph embedding procedure 350 represents each entity of the combined graph 332, i.e. each node and relation between nodes in a multidimensional space. It will be appreciated that the multidimensional space in which the set of combined graph vectors 352 are represented may be different than the multidimensional space in which the set of first graph vectors and second graph vectors have been represented and used to generate the combined graph 332.

The combined graph embedding procedure 350 outputs the set of combined graph vectors 352.

Subgraph Identification Procedure

The subgraph identification procedure 340 is configured to inter alia: (i) obtain the combined graph 332; (ii) obtain the set of unlabelled digital items 306; and (iii) map each entity in the set of unlabelled digital items 306 to one or more subgraphs of the combined graph 332 to obtain a set of matched subgraphs 342;

The subgraph identification procedure 340 obtains the combined graph 332 output by the graph combination procedure 330.

The subgraph identification procedure 340 obtains the set of unlabelled digital items 306. The set of unlabelled digital items 306 is of the same type as the set of labelled digital items 302, however each unlabelled digital item 308 is associated or has values without a known edge property type, i.e. relations between the unlabelled digital item 308 and its values are not labelled. The set of unlabelled digital items 306 may be represented as a graph where a given entity node corresponding to an unlabelled digital item 308 is linked via unknown edge type to a property value node.

The purpose of the subgraph identification procedure 340 is to identify any part of the combined graph 332 that contains or approximates a syntactic representation of the set of unlabelled digital items 306.

The subgraph identification procedure 340 matches each unlabelled digital item 308 to a respective subgraph in the combined graph 332. The matching may be performed based on the unlabelled digital item 308 and one or more of its respective values.

It will be appreciated that a matched subgraph in the set of matched subgraphs 342 may comprise a node, an edge, and combination of nodes connected by edges of the combined graph 332.

In one or more embodiments, the subgraph identification procedure 340 maps the unlabelled digital item 308 or entity in the set of unlabelled digital items 306 to a subgraph of the combined graph 332 based on at least one of a semantic similarity or syntactic similarity between the unlabelled digital item 308 and the respective subgraph.

In one or more embodiments, the subgraph identification 340 may generate vectors by embedding textual representations of each of the set of unlabelled digital items 306 and the combined graph 332 to perform the matching. In one or more embodiments, the semantic similarity and/or syntactic similarity may be in the form of a similarity score, and a given unlabelled digital item 644 may be mapped to a given subgraph based on the similarity score between the vector corresponding to the given unlabelled digital item 644 and the vector corresponding to elements of the given subgraph being above a threshold. As a non-limiting example, the similarity score may be determined based on a distance between the given vectors.

In one or more embodiments, the subgraph identification procedure 340 colors one or more elements (i.e., a node or edge) in the combined graph 332 that matches the given unlabelled digital item 308. After coloring, the subgraph identification procedure 340 extracts or generates a matched subgraph 344 by identifying the smallest subgraph including colored edges and colored nodes, which forms the matched subgraph 344.

The set of matched subgraphs 342 includes or approximates a syntactic representation of at least a portion of the set of unlabelled digital items 306, i.e. the set of matched subgraphs 342 represent elements of the set of unlabelled digital items 306.

With brief reference to FIG. 4, there is depicted a non-limiting example of the set of unlabelled digital items 306 as a set of unlabelled digital items 406 and the matched subgraph 344 as a matched subgraph 444 in accordance with one or more non-limiting embodiments of the present technology.

With reference to FIG. 3, it will be appreciated that in one or more alternative embodiments, the set of matched subgraphs 342 may only include one matched subgraph 344.

The subgraph identification procedure 340 outputs the set of matched subgraphs 342.

Potential Explanation Determination Procedure

The potential explanation determination procedure 360 is configured to inter alia: (i) obtain the set of matched subgraphs 342; (ii) obtain the set of combined graph vectors 352; (iii) calculate a respective subset of explanation expressivity scores 368 between each matched subgraph 344 and the edge property types based on the set of combined graph vectors 352; and (iv) determine, based on the respective subset of explanation expressivity scores 368, for each respective property edge type in the combined graph 332, a respective subset of potential explanation subgraphs 372.

In one or more embodiments, to calculate the respective explanation expressivity score for a subgraph, the potential explanation determination procedure 360 is configured to inter alia: (v) calculate a respective average vector 364 for a subgraph 344 based on the set of combined graph vectors 352; and (vi) determine a respective distance between each respective average vector 364 and a respective edge property type in the embedding space; and (vii) obtain the respective explanation expressivity scores based on the respective determined distances.

The potential explanation determination procedure 360 obtains the set of matched subgraphs 342 output by the subgraph identification procedure 340. In one or more embodiments, the potential explanation determination procedure 360 obtains the set of matched subgraphs 342 from the database 230.

The potential explanation determination procedure 360 obtains the set of combined graph vectors 352 output by the combined graph embedding procedure 350. In one or more embodiments, the potential explanation determination procedure 360 obtains the set of combined graph vectors 352 from the database 230.

The potential explanation determination procedure 360 identifies, for each matched subgraph 344 in the set of matched subgraphs 342, a respective subset of combined graph vectors which represents the matched subgraph 344 in the embedding space, i.e. corresponds to the matched subgraph 344.

It will be appreciated that the potential explanation determination procedure 360 may identify each element (i.e. node or edge) of the matched graph 344 in the embedding space to obtain the respective subset of combined graph vectors.

The potential explanation determination procedure 360 calculates, for each matched subgraph 344, a respective average vector 364 based on the respective subset of combined graph vectors. In one or more embodiments, the potential explanation determination procedure 360 obtains the respective average vector 364 by averaging the values of each element of the respective subset of combined graph vectors.

The potential explanation determination procedure 360 obtains, for the set of matched subgraphs 342, a set of average vectors 362.

The potential explanation determination procedure 360 calculates, for each average vector 364, a respective distance between the average vector 364 and a respective vector corresponding to a respective labelled edge type in the combined graph 332 to obtain a subset of distances 366. Thus, the potential explanation determination procedure 360 calculates a distance between the matched subgraph 344 and a respective edge property type via their respective representations in the embedding space.

The respective distance in the embedding space is indicative of a similarity between the average vector and the respective edge property edge type, i.e. the lower the distance, the higher the similarity and vice versa.

The potential explanation determination procedure 360 calculates, for each average vector 364, a respective explanation expressivity score based on the respective distance, to obtain a respective subset of explanation expressivity scores 368. The respective explanation expressivity score is indicative of a similarity between each matched subgraph and the respective edge property type via their respective representations in the embedding space.

The potential explanation determination procedure 360 outputs a set of potential explanation subgraphs 372 for the edge property type in the combined graph 332. Each edge property type is associated with a respective subset of potential explanation subgraphs 374 based on the explanation expressivity score. The respective subset of potential explanation subgraphs 374 is associated with a respective subset of potential explanation expressivity scores 368.

With brief reference to FIG. 4, there is depicted a non-limiting example of the set of potential explanation subgraphs 372 for the edge property type as a set of potential explanation subgraphs 472 in accordance with one or more non-limiting embodiments of the present technology.

Referring back to FIG. 4, the respective set of potential explanation subgraphs 372 are considered to be potential explanations for the respective edge property type corresponding to a given label in the set of labelled digital items 302.

Potential Explanation Ranking Procedure

The potential explanation ranking procedure 380 is configured to inter alia: (i) obtain the set of potential explanations subgraphs 372; (ii) rank, for each respective edge property type, based on the respective explanation expressivity score, a respective subset of potential explanation subgraphs 374 to obtain a ranked list of potential explanation subgraphs 384.

The potential explanation ranking procedure 380 obtains the set of potential explanations subgraphs 372 output by the potential explanation determination procedure 360. In one or more embodiments, the potential explanation ranking procedure 380 obtains the set of potential explanations subgraphs 372 from the database 230.

The potential explanation ranking procedure 380 ranks, for each respective edge property type, based on the respective subset of potential explanation expressivity scores 368, a respective subset of potential explanation subgraphs 374 to obtain a ranked list of potential explanation subgraphs 384.

In one or more embodiments, the potential explanation ranking procedure 380 ranks a potential explanation subgraph if the potential explanation subgraph has a potential explanation expressivity score 368 above a threshold.

The potential explanation ranking procedure 380 outputs, for each respective edge property type 318, respective set of ranked list of potential explanation subgraphs 384. The respective ranked list of potential explanations subgraphs 384 are considered to be potential explanations for the respective edge property type 318, i.e. class, ranked based on their respective probabilities, i.e. explanation expressivity scores.

With brief reference to FIG. 4, there is depicted a non-limiting example of the ranked list of potential explanation subgraphs 384 as a ranked list of potential explanation subgraphs 484 in accordance with one or more non-limiting embodiments of the present technology.

Method Description

Figure 5:
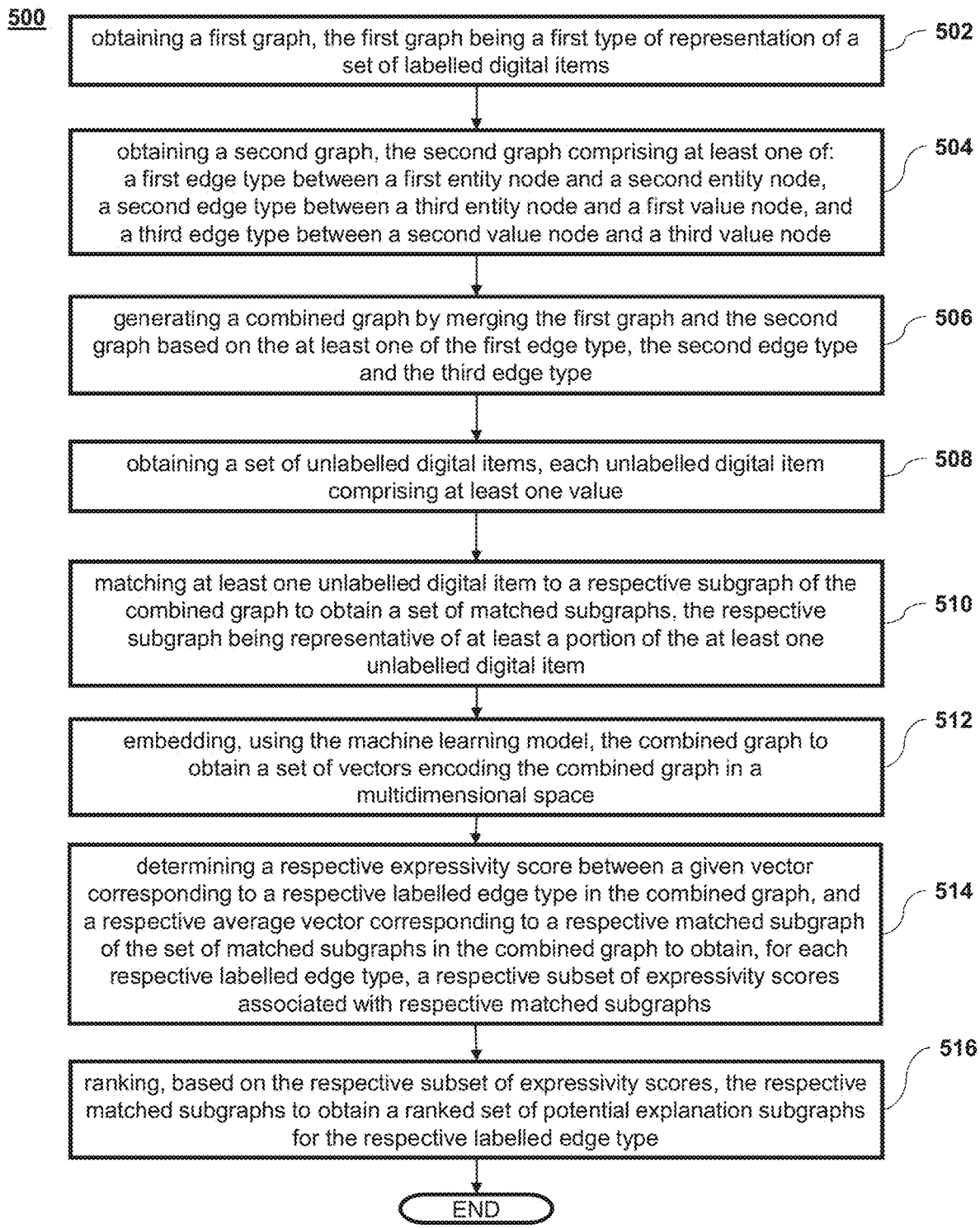
FIG. 5 depicts a flow chart of a method of ranking subgraphs as potential explanations for labelled edge types in accordance with one or more non-limiting embodiments of the present technology.

FIG. 5 depicts a flowchart of a method 500 executed in accordance with one or more non-limiting embodiments of the present technology.

The server 220 has access to the set of ML models 260 including the first graph embedding ML model 270 and the second graph embedding ML model 280.

In one or more embodiments, the server 220 has a processing device such as the processor 110 and/or the GPU 111 operatively connected to a non-transitory computer readable storage medium such as the solid-state drive 120 and/or the random-access memory 130 storing computer-readable instructions. The processing device upon executing the computer-readable instructions, is configured to execute the method 500. The method 500 starts at processing step 502.

According to processing step 502, the server 220 obtains the first graph 312, the first graph 312 being a first type of representation of a set of labelled digital items 302, each labelled digital item 304 being represented as a respective entity node connected via at least one respective labelled edge type to a respective value node.

In one or more embodiments, to obtain the first graph 312, the server 220 obtains and parses the set of labelled digital items 302 to generate the first graph 312. In one or more embodiments, the processor 110 uses the graph generation ML model 265 to obtain the first graph 312.

According to processing step 504, the server 220 obtains the second graph 322, the second graph 322 including at least one of: a first edge type between a first entity node and a second entity node in the first graph 312, a second edge type between a third entity node and a first value node in the first graph 312, and a third edge type between a second value node and a third value node in the first graph 312. The second graph 322 thus describes at least one type of relation between given elements in the first graph 312. The second graph 322 is represented as a set of second graph triples. The second graph 322 is a structured representation of the domain in which set of labelled digital items 302 has been obtained.

In one or more embodiments, the server 220 obtains the second graph 322 from the database 230.

According to processing step 506, the server 220 generates the combined graph 332 by merging the first graph 312 and the second graph 211 based on the at least one of the first edge type, the second edge type and the third edge type. The processor 110 merges corresponding elements in the first graph 312 and the second graph 322 to obtain a single graph representation in the form of the combined graph 332. In one or more embodiments, the server 220 merges a given element from the first graph 312 to a given element from the second graph 322 based on at least one of: a syntactic similarity between the given elements and a semantic similarity between the given elements. It will be appreciated that the given element may be a node, such as an entity node or a value node, or an edge.

In one or more embodiments, the server 220 has access to the second graph embedding ML model 280 to embed the first graph 312 to generate a set of first graph vectors and the second graph 322 to generate a set of second graph vectors, respectively. The set of first graph vectors encodes the first graph in a multidimensional space and represents at least one of syntactic features and semantic features of the first graph 312. The set of second graph vectors encodes the second graph in a multidimensional space and represents at least one of syntactic features and semantic features of the second graph. The server 220 determines at least one of syntactic similarity and semantic similarity between one or more of the set of first graph vectors and the set of second graph vectors to merge corresponding portions of the first graph 312 and the second graph 322 to generate the combined graph 332.

According to processing step 508, the server 220 obtains the set of unlabelled digital items 306, each unlabelled digital item 308 comprising at least one value. Each unlabelled digital item 308 is associated or has values without a known edge property type, i.e. relations between the unlabelled digital item 308 representing a node entity and its property value nodes are not labelled.

According to processing step 510, the server 220 matches at least one unlabelled digital item 308 to a respective subgraph of the combined graph 332 to obtain a set of matched subgraphs 342, the respective subgraph being representative of at least a portion of the at least one unlabelled digital item 308. The at least portion includes the matched unlabelled digital item 308 and/or one or more of its respective values.

In one or more embodiments, the server 220 maps the unlabelled digital item 308 or entity in the set of unlabelled digital items 306 to a subgraph of the combined graph 332 based on at least one of a semantic similarity or syntactic similarity between the unlabelled digital item 308 and the respective subgraph. In one or more embodiments, the server 220 generates vectors by embedding textual representations of each of the set of unlabelled digital items 306 and the combined graph 332 to perform matching. In one or more embodiments, the semantic similarity and/or syntactic similarity may be in the form of a similarity score, and a given unlabelled digital item 308 may be mapped to a given subgraph based on the similarity score between the vector corresponding to the given unlabelled digital item 644 and the vector corresponding to elements of the given subgraph being above a threshold.

According to processing step 512, the server 220 embeds the combined graph 322 to generate a set of combined graph vectors 352 encoding the combined graph 322 in a multi-dimensional space.

In one or more embodiments, the server 220 has access to the first graph embedding ML model 270 having been trained to generate graph embeddings. The server 220 provides the combined graph 332 to the first graph embedding ML model 270 to obtain the set of combined graph vectors 352. The set of combined graph vectors 352 encodes syntactic features and semantic features of the combined graph 332. Each combined graph vector 354 is computed by measuring the impact or contribution of the represented element on the robustness of the combined graph 332. The set of combined graph vectors 352 thus encodes nodes including entity nodes and property value nodes, and edge types including property value (labelled) edge types of the combined graph 332.

According to processing step 514, the server 220 determines a respective similarity score between a given vector corresponding to a respective labelled edge type in the combined graph 332, and a respective average vector corresponding to a respective matched subgraph 344 of the set of matched subgraphs 342 in the combined graph 332 to obtain, for each respective labelled edge type, a respective subset of explanation expressivity scores 368. The respective subset of explanation expressivity scores 368 is associated with potential explanations subgraphs 372.

In one or more embodiments, the server 220 calculates, for each matched subgraph 344, a respective average vector 364 based on the respective subset of combined graph vectors. The potential explanation determination procedure 360 obtains, for the set of matched subgraphs 342, a set of average vectors 362.

The server 220 calculates, for each average vector 364, a respective distance between the average vector 364 and a respective vector corresponding to a respective labelled edge type in the combined graph 332 to obtain a subset of distances 366. The potential explanation determination procedure 360 calculates, for each average vector 364, a respective explanation expressivity score based on the respective distance, to obtain a respective subset of explanation expressivity scores 368. The respective explanation expressivity score is indicative of a similarity between each matched subgraph and the respective edge property type via their respective representations in the embedding space.

According to processing step 516, the server 220 ranks, for each respective edge property type 318, based on the respective subset of potential explanation expressivity scores 368, the respective subset of potential explanation subgraphs 374 to obtain a ranked list of potential explanation subgraphs 384.

According to processing step 518, the server 220 provides a given subgraph of a respective subset of potential explanation subgraphs 374 as a potential explanation for the labelled edge type, i.e. the determined class. In one or more embodiments, the server 220 provides the given subgraph based on its respective rank and/or based on the respective subset of potential explanation expressivity scores 368.

The method 500 then ends.

One or more embodiments of the present technology may be used for providing subgraphs as explanations for classification tasks in graphs performed by machine learning models. Non-limiting examples of applications of graph classification tasks include content recommendation, optimal fuel consumption, and pathology detection in medical imaging.

It will be appreciated that at least one or more embodiments of the present technology aim to expand a range of technical solutions for addressing a particular technical problem, namely improving performance of deep neural networks used for classification tasks in graphs by providing one or more subgraphs as potential explanations for a given class which enables interpretability of the classification, which may in turn enable tuning a deep neural network to be less prone to errors and enable saving computational resources.

It will be appreciated that not all technical effects mentioned herein need to be enjoyed in each and every embodiment of the present technology. For example, one or more embodiments of the present technology may be implemented without the user enjoying some of these technical effects, while other non-limiting embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fiber-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting.

What is claimed is:

1. A method for ranking subgraphs as potential explanations for a labelled edge type class, the method being executed by a processor, the processor having access to a machine learning model having been trained to embed graphs, the method comprising:

obtaining a first graph, the first graph being a first type of representation of a set of labelled digital items, each labelled digital item being represented as a respective entity node connected via at least one respective labelled edge type to a respective value node;

obtaining a second graph, the second graph being a second type representation of relations in the set of labelled digital items, the second graph comprising at least one of:

a first edge type between a first entity node and a second entity node, a second edge type between a third entity node and a first value node, and a third edge type between a second value node and a third value node;

generating a combined graph by merging the first graph and the second graph based on the at least one of the first edge type, the second edge type and the third edge type;

obtaining a set of unlabelled digital items, each unlabelled digital item comprising at least one value;

matching at least one unlabelled digital item to a respective subgraph of the combined graph to obtain a set of matched subgraphs, the respective subgraph being representative of at least a portion of the at least one unlabelled digital item;

embedding, using the machine learning model, the combined graph to obtain a set of vectors encoding the combined graph in a multidimensional space;

determining a respective expressivity score between a given vector corresponding to a respective labelled edge type in the combined graph, and a respective average vector corresponding to a respective matched subgraph of the set of matched subgraphs in the combined graph to obtain, for each respective labelled edge type, a respective subset of expressivity scores associated with respective matched subgraphs;

ranking, based on the respective subset of expressivity scores, the respective matched subgraphs to obtain a ranked set of potential explanation subgraphs for the respective labelled edge type.

2. The method of claim 1, further comprising:

providing, based on a respective position, a given subgraph of the ranked set of potential explanation subgraphs as a potential explanation for the respective labelled edge type.

3. The method of claim 2, wherein the generating of the combined graph is based on at least one of:

a syntactic similarity between a portion of the first graph and a portion of the second graph, and a semantic similarity between the portion of the first graph and the portion of the second graph.

4. The method of claim 3, further comprising, prior to the generating of the combined graph:

embedding, using the machine learning model, the first graph to obtain a set of first graph vectors encoding the first graph; and embedding, using the machine learning model, the second graph to obtain a set of second graph vectors encoding the second graph; and wherein the generating of the combined graph is based on at least a subset of the first graph vectors encoding the first graph and at least a subset of the second graph vectors encoding the second graph.

5. The method of claim 4, wherein the embedding of the first graph and the second graph comprises encoding respective semantic features and respective syntactic features of the first graph and the second graph in the set of first graph vectors and the set of second graph vectors respectively.

6. The method of claim 5, wherein the generating of the combined graph based on the syntactic similarity comprises determining a similarity score between respective syntactic features of the subset of first graph vectors and the subset of second graph vectors, and the generating of the combined graph based on the semantic similarity comprises determining a similarity score between respective semantic features of the subset of first graph vectors and the subset of second graph vectors.

7. The method of claim 6, further comprising, prior to the matching of the at least one unlabelled digital item to the respective subgraph:

embedding the set of unlabelled digital items to obtain a set of unlabelled vectors encoding the set of unlabelled digital items; and wherein the matching of the at least one unlabelled digital item to the respective subgraph is based on at least one of respective semantic features and respective syntactic features of the set of unlabelled vectors and a subset of vectors corresponding to the subgraph.

8. The method of claim 7, further comprising prior to the determining of the respective expressivity score between the given vector corresponding to the respective edge type and the respective average vector corresponding to the respective matched subgraph:

identifying, from the set of vectors, for each matched subgraph in the combined graph, a corresponding subset of vectors; and calculating the respective average vector based on the corresponding subset of vectors.

9. The method of claim 8, further comprising, prior to the generating the first graph:

obtaining the set of labelled digital items; and parsing, using a graph generation machine learning model, the set of labelled digital items to generate the first graph.

10. The method of claim 9, wherein the set of labelled digital items is represented as a table; wherein each respective entity node is represented as a respective row in the table, each labelled edge type is represented as a respective column in the table, and each respective value node connected to the respective entity node via the respective edge type is represented as a respective value of the respective line at the respective column.

11. A system for ranking subgraphs as potential explanations for a labelled edge type class, the system comprising a processor, the processor having access to a machine learning model having been trained to embed graphs, the processor being operatively connected to a non-transitory storage medium comprising instructions, the processor upon executing the instructions, being configured for:

obtaining a first graph, the first graph being a first type of representation of a set of labelled digital items, each labelled digital item being represented as a respective entity node connected via at least one respective labelled edge type to a respective value node;

obtaining a second graph, the second graph being a second type representation of relations in the set of labelled digital items, the second graph comprising at least one of:

a first edge type between a first entity node and a second entity node, a second edge type between a third entity node and a first value node, and a third edge type between a second value node and a third value node;

generating a combined graph by merging the first graph and the second graph based on the at least one of the first edge type, the second edge type and the third edge type;

obtaining a set of unlabelled digital items, each unlabelled digital item comprising at least one value;

matching at least one unlabelled digital item to a respective subgraph of the combined graph to obtain a set of matched subgraphs, the respective subgraph being representative of at least a portion of the at least one unlabelled digital item;

embedding, using the machine learning model, the combined graph to obtain a set of vectors encoding the combined graph in a multidimensional space;

determining a respective expressivity score between a given vector corresponding to a respective labelled edge type in the combined graph, and a respective average vector corresponding to a respective matched subgraph of the set of matched subgraphs in the combined graph to obtain, for each respective labelled edge type, a respective subset of expressivity scores associated with respective matched subgraphs; and ranking, based on the respective subset of expressivity scores, each respective matched subgraph to obtain a ranked set of potential explanation subgraphs for the respective labelled edge type.

12. The system of claim 11, wherein the processor is further configured for:

providing, based on a respective position, a given subgraph of the ranked set of potential explanation subgraphs as a potential explanation for the respective labelled edge type.

13. The system of claim 12, wherein the generating of the combined graph is based on at least one of:

a syntactic similarity between a portion of the first graph and a portion of the second graph, and a semantic similarity between the portion of the first graph and the portion of the second graph.

14. The system of claim 13, wherein the processor is further configured for, prior to the generating of the combined graph:

embedding, using the machine learning model, the first graph to obtain a set of first graph vectors encoding the first graph; and embedding, using the machine learning model, the second graph to obtain a set of second graph vectors encoding the second graph; and wherein the generating of the combined graph is based on at least a subset of the first graph vectors encoding the first graph and at least a subset of the second graph vectors encoding the second graph.

15. The system of claim 14, wherein the embedding of the first graph and the second graph comprises encoding respective semantic features and respective syntactic features of the first graph and the second graph in the set of first graph vectors and the set of second graph vectors respectively.

16. The system of claim 15, wherein the generating of the combined graph based on the syntactic similarity comprises determining a similarity score between respective syntactic features of the subset of first graph vectors and the subset of second graph vectors, and the generating of the combined graph based on the semantic similarity comprises determining a similarity score between respective semantic features of the subset of first graph vectors and the subset of second graph vectors.

17. The system of claim 16, wherein the processor is further configured for, prior to the matching of the at least one unlabelled digital item to the respective subgraph:

embedding the set of unlabelled digital items to obtain a set of unlabelled vectors encoding the set of unlabelled digital items; and wherein the matching of the at least one unlabelled digital item to the respective subgraph is based on at least one of respective semantic features and respective syntactic features of the set of unlabelled vectors and a subset of vectors corresponding to the subgraph.

18. The system of claim 17, wherein the processor is further configured for, prior to the determining of the respective expressivity score between the given vector corresponding to the respective edge type and the respective average vector corresponding to the respective matched subgraph:

identifying, from the set of vectors, for each matched subgraph in the combined graph, a corresponding subset of vectors; and calculating the respective average vector based on the corresponding subset of vectors.

19. The system of claim 18, wherein the processor is further configured for, prior to the generating the first graph:

obtaining the set of labelled digital items; and parsing, using a graph generation machine learning model, the set of labelled digital items to generate the first graph.

20. The system of claim 19, wherein the set of labelled digital items is represented as a table; wherein each respective entity node is represented as a respective row in the table, each labelled edge type is represented as a respective column in the table, and each respective value node connected to the respective entity node via the respective edge type is represented as a respective value of the respective line at the respective column.

* * * * *